United States Patent [19]
Kimura et al.

[11] Patent Number: 5,686,809
[45] Date of Patent: Nov. 11, 1997

[54] COMBINATION SOLAR AND EXTERNAL BATTERY POWERED CAMERA BATTERY CHARGER

[75] Inventors: Tsutomu Kimura, Tokyo; Yoshihiro Fujita, Saitama; Kenta Namioka, Saitama; Yasuhiro Nishitani, Saitama; Shoji Inaba; Yoshiaki Sakamoto, both of Tokyo, all of Japan

[73] Assignee: Fuji Photo Film Co., Ltd., Kanagawa, Japan

[21] Appl. No.: 644,111

[22] Filed: May 10, 1996

[30] Foreign Application Priority Data

| May 12, 1995 | [JP] | Japan | 7-114696 |
| May 12, 1995 | [JP] | Japan | 7-114698 |
| May 12, 1995 | [JP] | Japan | 7-114699 |
| May 12, 1995 | [JP] | Japan | 7-114700 |
| May 12, 1995 | [JP] | Japan | 7-114701 |
| Oct. 6, 1995 | [JP] | Japan | 7-260419 |

[51] Int. Cl.$^6$ .................................................. H01M 10/46
[52] U.S. Cl. ........................................ 320/2; 320/61
[58] Field of Search ................... 320/2, 5, 61; 323/906; 136/293, 243; 354/484

[56] References Cited

U.S. PATENT DOCUMENTS

| 3,921,049 | 11/1975 | Mellors et al. | 320/2 |
| 4,328,456 | 5/1982 | Suzuki et al. | 320/7 |
| 4,494,854 | 1/1985 | Yamaga et al. | 354/484 |
| 5,424,800 | 6/1995 | Suzuki | 354/484 |

FOREIGN PATENT DOCUMENTS 56-79126   6/1981   Japan .

*Primary Examiner*—Edward Tso
*Attorney, Agent, or Firm*—Young & Thompson

[57] ABSTRACT

In a camera battery charger, a solar battery is provided upon a lid of a camera case, and a charging circuit for charging the in-camera battery by the solar battery or an external battery. When a camera is stored in a main body of the case, the in-camera battery is electrically connected to a power supply output terminal of the charging circuit, and is normally charged by the solar battery. When high-speed charging is necessary, the in-camera battery is charged at high speed by an external battery in an external battery adapter set in the main body of the case, or an external battery stored in an external battery storage part integrated with the main body of the case.

20 Claims, 9 Drawing Sheets

COMBINATION SOLAR AND EXTERNAL BATTERY POWERED CAMERA BATTERY CHARGER

BACKGROUND OF THE INVENTION

1. Field of the Invention

The present invention relates to a camera battery charger, and more particularly to a camera battery charger which charges an in-camera battery by a solar battery.

2. Description of the Related Art

There is proposed a camera case with a solar battery, making it possible to charge an in-camera battery by a solar battery (a Ni-Cd battery, a silver cell, or the like in the embodiment of a Japanese Utility Model Laid-open Publication No. 56-79126) provided in the camera case.

The Japanese Utility Model Laid-open No. 56-79126 discloses that the solar battery is provided in the camera case so that the in-camera battery can be electrically charged when carried in the case, and that charging time of the solar battery is sufficient compared to attachment time of the camera to the case.

The solar battery, of suitable size for being provided in the camera case, generates an extremely slight amount of electricity. Therefore, in order to charge the in-camera battery as predetermined, the camera case storing the camera has to be placed under the sun for a long period of time.

Accordingly, if the in-camera battery is discharged, and photographing cannot be performed, the in-camera battery cannot be electrically charged at a high speed. So, there is a problem in that the camera cannot be used unless the in-camera battery is replaced by another one, which has already been charged.

When a special battery for a camera, which can be electrically charged and electrically discharges a little, is used as the in-camera battery, a person sometimes cannot obtain the battery easily. Moreover, there is a case that the in-camera battery is not on the market, and the batteries can be replaced only at a camera shop, etc. In the above-mentioned cases, there is a problem in that the in-camera batteries cannot be obtained in an emergency.

In the conventional camera battery charger, an internal circuit for controlling the charge is driven by an external power supply such as a flashlight battery, a button battery, etc. So, there is a problem in that the apparatus becomes expensive and too large.

Furthermore, it is convenient if one camera battery charger is also used as a battery charger for the in-camera battery in plural types of cameras. However, the voltage of the in-camera battery sometimes differs according to the camera type. In this case, if a booster circuit in a charging circuit is designed so as to correspond to the highest voltage in-camera battery, the booster ratio becomes too high when the in-camera battery having a low voltage is charged, lowering the charging efficiency.

SUMMARY OF THE INVENTION

It is an object of the present invention to provide a camera battery charger, which satisfactorily charges its in-camera battery by a solar battery, and which can charge the in-camera battery at high speed in an emergency.

It is another object of the present invention to provide a camera battery charger wherein it is easily known whether an in-camera battery is being charged by a solar battery or an external battery, and a quantity of electricity charged in the in-camera battery is also known easily, and furthermore, the in-camera battery can be charged satisfactorily even if electromotive forces of the solar battery and the external battery are different.

It is yet another object of the present invention to provide a camera battery which does not use a flashlight battery, a button battery, etc., and is driven only by electricity generated by a solar battery.

It is yet another object of the present invention to provide a camera battery charger which charges an in-camera battery in plural types of cameras having different voltage of the in-camera battery, and can charge each in-camera battery efficiently.

In order to achieve the above-mentioned objects, the present invention comprises: a camera case for storing therein a camera having a chargeable in-camera battery; a solar battery provided in the camera case; an external battery adapter for storing therein an external battery which is freely attached and detached from the camera case; and a charging means including a power supply output terminal connected to the camera stored in the camera case for charging the in-camera battery by the solar battery, and charging the in-camera battery in the external battery adapter when the external battery adapter is set in the camera case. Thus, when the camera is stored in the camera case, the in-camera battery is electrically connected to the power supply output terminal of the charging means, and is charged by the solar battery. When the external battery adapter is attached to the camera case, the in-camera battery is charged at a high speed by the external battery in the external battery adapter.

Moreover, in the present invention, an external battery storage part may be provided instead of the external battery adapter so as to store the external battery in the camera case. In this case, when the external battery is stored in the external battery storage part, the in-camera battery is charged at a high speed by the external battery in the external battery storage part.

Furthermore, the present invention is provided with a display means having a first display part for indicating that the in-camera battery is being charged by the solar battery and a second display part for indicating that the in-camera battery is being charged by the external battery; and a display part changing means for making the first display part of the display means display while the in-camera battery is being charged by the solar battery and for making the second display part of the display means display while the in-camera battery is being charged by the external battery. It can be easily known from the display means whether the in-camera battery is being charged by the solar battery or the external battery. Furthermore, the quantity of electric charge in the in-camera battery is displayed by the display means, so that a quantity of electric charge or residue in the in-camera battery can be known.

Moreover, according to the present invention, a camera battery charger having a chargeable in-camera battery comprises: a solar battery; an external battery having a different electromotive force from the force generated by the solar battery; a first booster means for boosting a voltage generated by the solar battery; a second booster means for boosting a voltage which is output from the external battery so that the voltage can be substantially equal to the voltage boosted by the first booster means; and a charge control means for controlling the first booster means when the external battery is not set so that the in-camera battery is charged by the solar battery and for controlling the second booster means when the external battery is set so that the in-camera battery is charged by the external battery. As has been described, in the present invention, when the external battery is not attached, the first booster means is controlled, so that the in-camera battery is charged by the solar battery. When the external battery is attached, the second booster means is controlled so that the in-camera battery is charged by the external battery. Thus, the booster ratio can be set so as to correspond to electromotive force of each battery, and therefore the charging can be performed efficiently.

Furthermore, according to the present invention, a camera battery charger having a chargeable in-camera battery comprises: a solar battery; a power supply charged by the solar battery; and a charging means driven by the power supply for charging the in-camera battery depending on a quantity of electricity obtained from the solar battery. Thus, there is no need for a flashlight battery, a button battery, etc., and the charger can be driven only by the electricity generated by the solar battery.

Furthermore, according to the present invention, a battery charger in plural types of cameras having rechargeable in-camera batteries with different voltage, comprises: a booster means, of which booster ratio can be changed so that a voltage generated by a solar battery is suitable for charging the in-camera battery in plural types of cameras; a means for detecting or setting a piece of information as to a voltage of the in-camera battery in the camera to be charged; and a charge control means for changing the booster ratio of the booster means depending on the detected or set information as to the voltage of the in-camera battery, so that the in-camera battery can be charged. That is, when the information as to the voltage of the in-camera battery in the camera to be charged is detected or set, the booster ratio of the booster means is changed depending on the information as to the voltage of the in-camera battery. Then, the in-camera battery is charged by an appropriate charging voltage, which has been boosted by the booster means. Thus, the in-camera batteries in plural types of cameras, which have different voltage of their in-camera batteries, can be charged efficiently regardless of the voltage of the in-camera battery.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
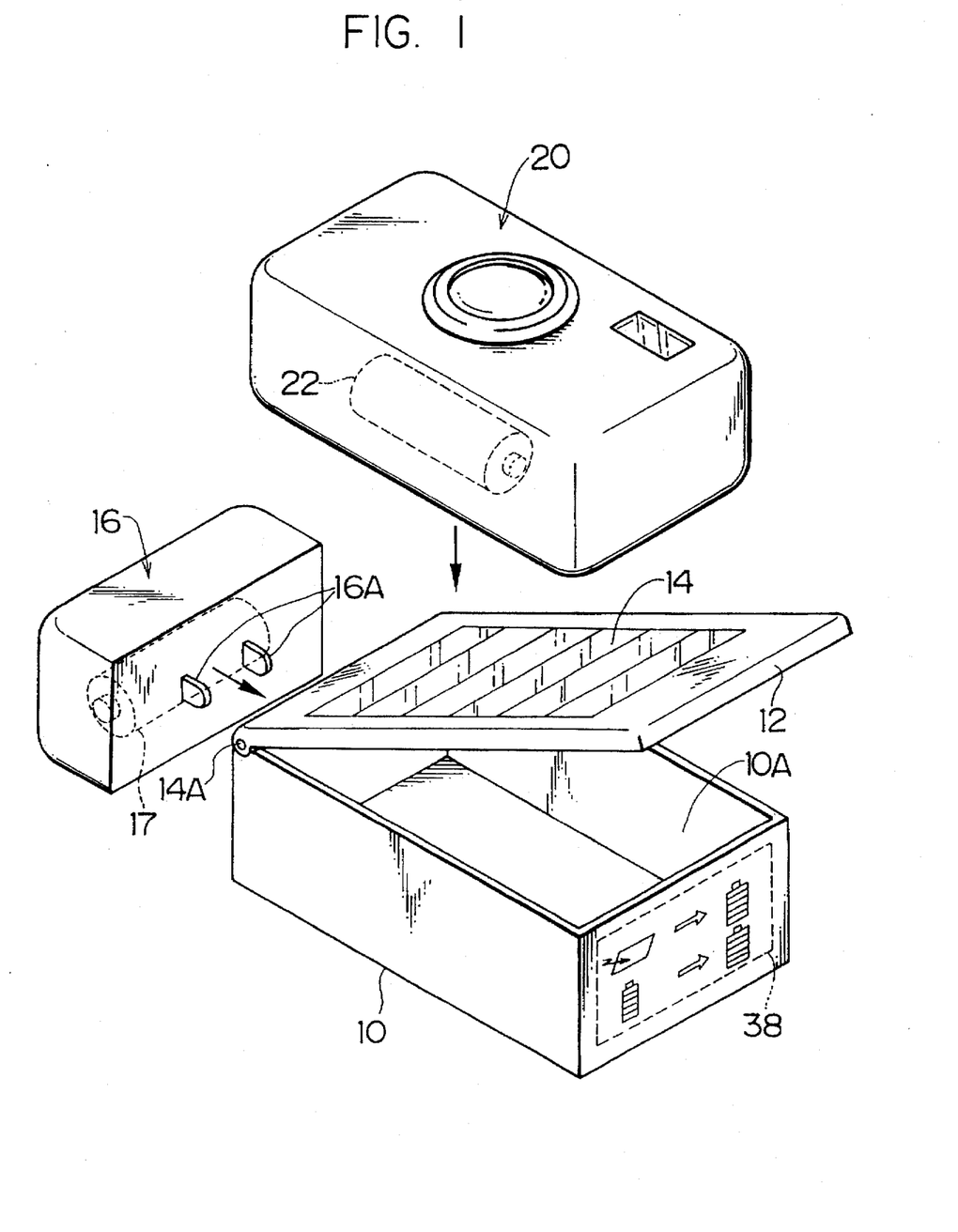
FIG. 1 is a perspective view illustrating an embodiment of the camera battery charger according to the present invention.

FIG. 1 is a perspective view illustrating an embodiment of a camera battery charger according to the present invention. As shown in the drawing, the camera battery charger comprises a main body of a case 10, a lid 12, a solar battery 14, an external battery adapter 16, a charging circuit 30 (FIG. 2), or the like.

The main body of the case 10 and the lid 12 are made of a rigid material such as aluminum or plastic which shields light. A camera storage part 10A for storing a camera 20 is formed in the main body of the case 10. The solar battery 14 of, for example, 100 mm×55 mm size, is arranged in the lid 12.

The lid 12 is provided in such a manner to rotate around an axis 14A freely with respect to the main body of the case 10. The angle of the lid 12 with respect to the main body of the case 10 can be adjusted. Therefore, the solar battery 14 can be directed towards the sun.

A print substrate (not shown), on which a later-described charging circuit, etc. are placed, is provided in the main body of the case 10. The print substrate is electrically connected to the solar battery 14. When the external battery adapter 16 is attached to the main body of the case 10, an external battery 17, which is housed in the external battery adapter 16, is electrically connected to the print substrate. Incidentally, the external battery 17 is, for example, a size AA battery.

The print substrate is also connected to a power source output terminal (not shown), which is pressed towards the camera storage part 10A by a spring in such a manner to move back and forth. When the camera 20 is housed in the camera storage part 10A, the power source output terminal is connected to an in-camera battery 22, which is housed in the camera 20, by a power source input terminal in the camera. Incidentally, the in-camera battery 22 is a special battery for a camera, which is electrically charged without discharging electrically by itself. For example, the battery 22 has a self-discharge rate of 5%/year or less, and the voltage of the battery 22 is 3.2V when it is fully charged.

Next, a detailed explanation will be given of the in-camera battery which is electrically charged by the camera battery charger.

Manganese dioxide is desirable as a positive electrode active material of the in-camera battery. In particular, the manganese dioxide, which is synthesized by electrolysis, and the manganese dioxide, which is synthesized chemically, are desirable. Lithium metal and Lithium alloy (every metal which makes lithium and alloy; in particular, Al, Mn, Sn, Mg, Cd, and In are desirable. The alloy including Al is the best of all) are desirable as a negative electrode active material.

A conductive agent, binding agent, and filler may be added to the electrode depolarizing mix for the cell. Any conductive agent will do only if it is an electronic conductive material which does not change chemically in the battery. The addition is not particularly limited; however, 1–50 weight % is desirable, and in particular, 2–30 weight % is desirable.

Polyose, thermoplastic resin, a sort of polymer having a rubber elasticity, or a mixture of them can be used as the binding agent. The addition of the binding agent is not particularly limited; however, 1–50 weight % is desirable, and in particular, 2–30 weight % is desirable.

Any filler will do only if it is a fibrous material, which does pot change chemically in the battery. Textiles like olefinic polymer such as polypropylene and polyethylene, glass, carbon, etc. are generally used. The addition of the filler is not particularly limited; however, 0–30 weight % is desirable.

Nonaqueous electrolyte is generally composed of solvent, lithium salt (anion and cation) which is dissolved in the solvent. The electrolyte is preferably a mixture of propylene carbonate and/or butylen carbonate and 1,2-dimethoxyethane and/or diethyl carbonate, which includes $LiCF_3SO_3$, $LiC1O_4$, $LiBF_4$ and/or $LiPF_6$. The amount of the electrolyte added to the battery is not particularly restricted. The amount depends on the amount of the positive electrode active material and the negative electrode active material and the size of the battery.

Next, an explanation will be given of the case when the in-camera battery 22 is electrically charged.

In this case, the camera is housed in the camera battery charger (see FIG. 1). It is desirable that the camera battery charger be placed by the window in a room so that the sun light through the window can enter the solar battery 14 provided in the lid 12. The angle of the lid 12 is adjusted so that the sun light can enter the solar battery 14 at a substantially right angle.

Figure 2:
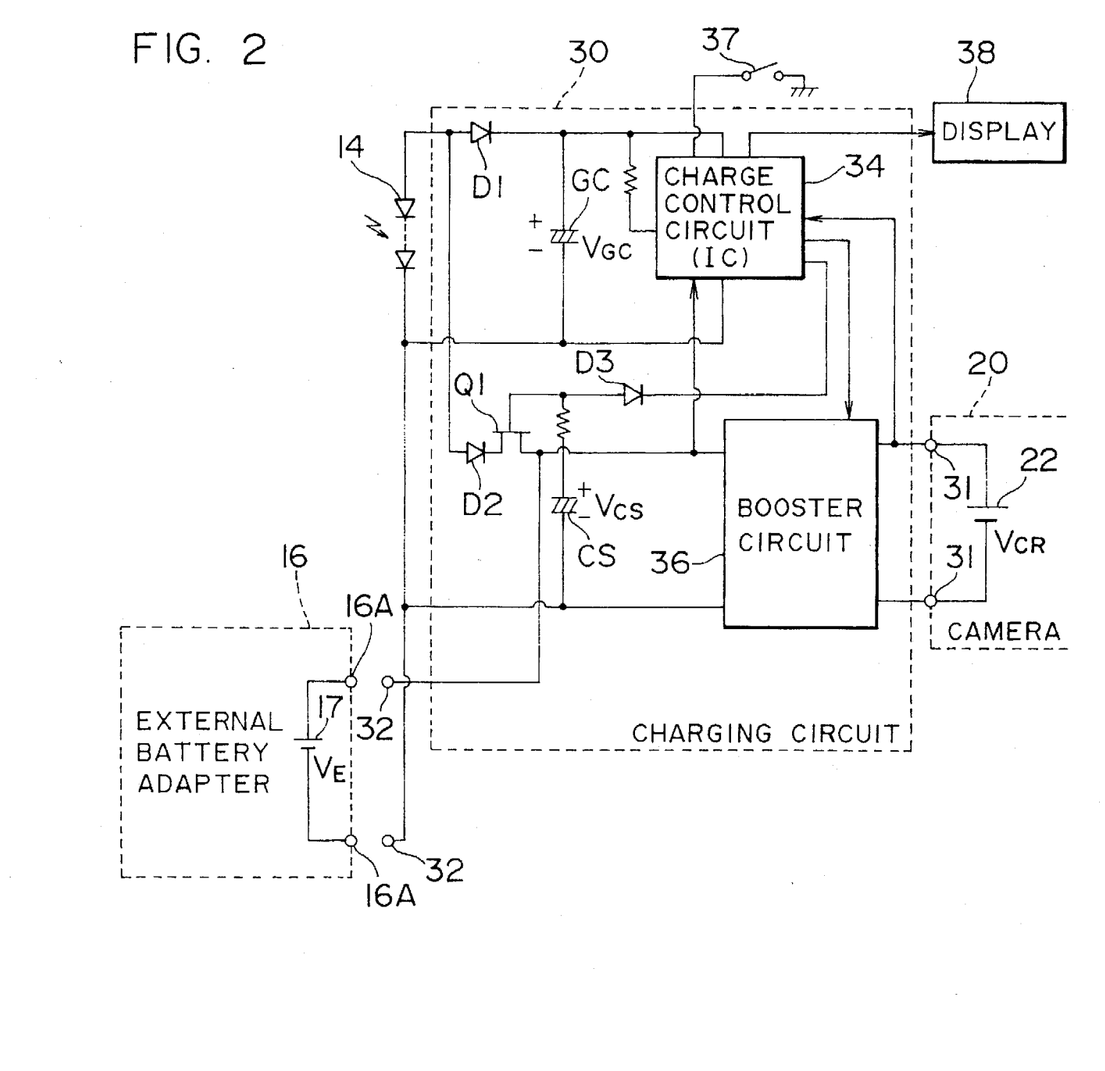
FIG. 2 is a circuit diagram illustrating an embodiment of a charging circuit provided in the camera battery charger in FIG. 1.

FIG. 2 is a circuit diagram illustrating an embodiment of the charging circuit provided in the main body of the case 10 in FIG. 1. As shown in the drawing, the charging circuit 30 mainly comprises, a charge control circuit 34, a booster circuit 36, diodes D1, D2 and D3, an electrical double layer condenser GC, a condenser CS, a transistor Q1, and the like. The charging control circuit 34 is connected to a switch 37, which is turned on and off in connection with the attachment and detachment of the external battery adapter 16. The charging control circuit 34 is also connected to a display 38 which shows a liquid crystal display of the charging quantity, etc.

In FIG. 2 a power supply input terminal of the camera 20 is connected to a power source output terminal 31 in the charging circuit. On the other hand, a terminal 16A of the external battery adapter 16 is not connected to the external power source input terminal 32 in the charging circuit 30.

In this case, a slight electric current, which is generated by the solar battery, charges electrical double layer condenser GC through diode D1, which prevents a reverse current. The electrical double layer condenser GC, which has been electrically charged as described above, is used as a power source for driving the charge control circuit 34, the display 38, and the like. Incidentally, the maximum value of a terminal voltage $V_{GC}$ of the electrical double layer condenser GC is around 3.0V.

The slight electric current generated by the solar battery 14 also charges the condenser CS through diode D2, which prevents a reverse current, and the transistor Q1.

The charge control circuit 34 controls the booster circuit 36, the display 38, the transistor Q1, and the like. It detects a voltage $V_{CS}$ of the condenser CS and the voltage $V_{CR}$ of the in-camera battery 22, and also detects whether the switch 37 is on or off.

The charge control circuit 34 inactivates the booster circuit 36 when the voltage $V_{CR}$ of the in-camera battery 22 is 3.2V or more. When the voltage $V_{CS}$ of the condenser CS is 1.5V, the charge control circuit 34 turns off the transistor Q1, and thereby controls the voltage $V_{CS}$ of the condenser CS to prevent it from being more than 1.5V.

When the voltage $V_{CR}$ of the in-camera battery 22 is less than 3.2V, the charge control circuit 34 controls the booster circuit 36 so as to electrically charge the in-camera battery 22 by electricity which has been charged in the condenser CS. That is, when the voltage $V_{CR}$ of the in-camera battery 22 is smaller than 3.2V, and if the condenser CS is electrically charged and its terminal voltage $V_{CS}$ is 1.5V, the charge control circuit 34 drives the booster circuit 36. Then, when the electricity which has been charged in the condenser CS is discharged electrically and the terminal voltage $V_{CS}$ is 0.9V, the charge control circuit 34 stops the booster circuit 36.

Next, an explanation will be given of the booster circuit 36.

Figure 3:
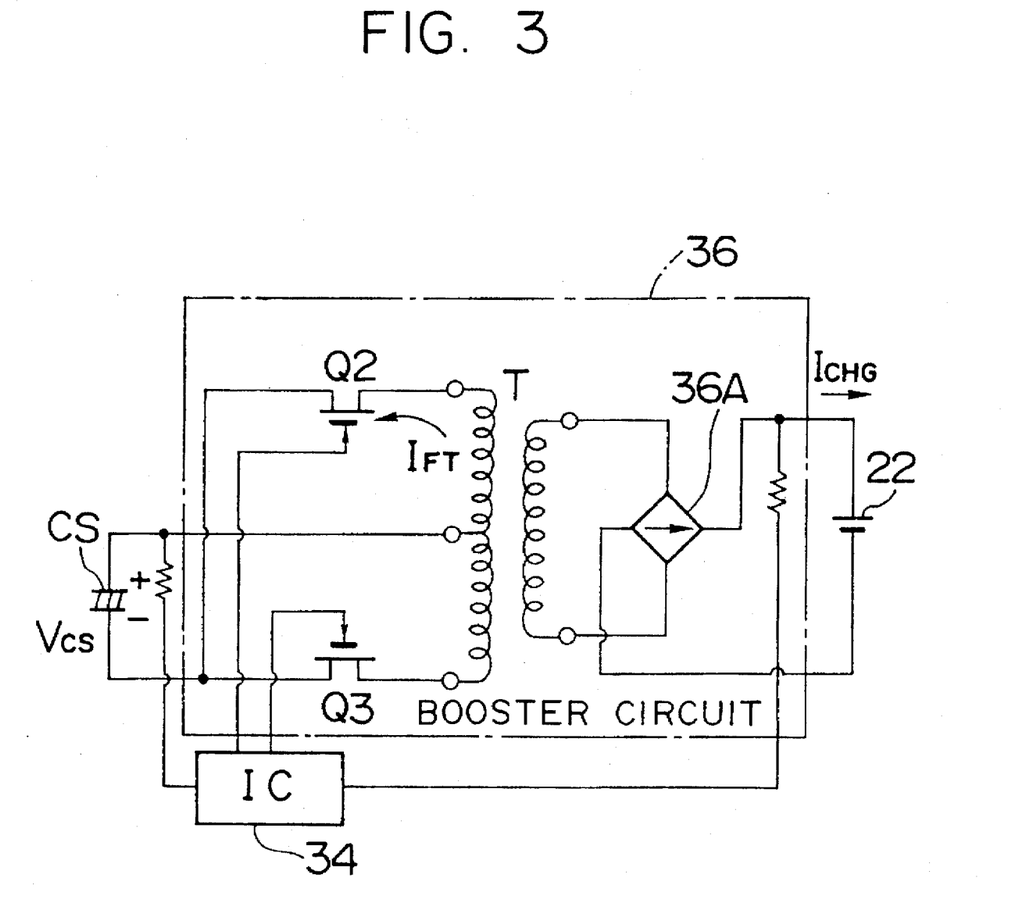
FIG. 3 is a circuit diagram illustrating an embodiment of a booster circuit in FIG. 2.

FIG. 3 is a circuit diagram illustrating an embodiment of the booster circuit 36. As shown in the drawing, the booster circuit 36 is a push-pull type, and converts a DC power source, which is the charged condenser CS, into AC by transistors Q2 and Q3, which are turned on alternatively by the charge control circuit 34. Then the booster circuit 36 boosts the power source via a transformer T, and rectifies it in a rectifying circuit 36A so as to convert it into a DC voltage required for electrically charging the in-camera battery 22.

If the number of turns on the primary side and the secondary side of the transformer T is $n_1$ and $n_2$, respectively, there is the following relationship between them and a voltage $V_1$ on the primary side and a voltage on the secondary side:

$$V_1/V_2 = n_1/n_2 \quad (1)$$

On the other hand, the required voltage $V_1$ and $V_2$ on the primary and secondary sides of the transformer T are as follows:

$$V_1 = 0.9 - V_{DS} = 0.7 \text{ [V] (Min)} \quad (2)$$

$$V_2 = 3.2 + 0.7 \times 2 + 0.5 = 5.1 \text{ [V]} \quad (3)$$

(0.9: a minimum voltage of the external battery 17

$V_{DS}$: a saturation voltage between drain and source of the transistors Q2 and Q3

3.2: a maximum voltage of the in-camera battery 22

0.7×2: the fall in the voltage in the rectifying circuit 36A)

Therefore, the ratio $n_2/n_1$ of the number of turns of the transformer T is:

$$n_2/n_1 = V_2/V_1 = 7.3$$

In order to get $I_{CHG} = 100$ mA as a charge electric current $I_{CHG}$ of the in-camera battery 22, an electric current $I_{FT}$ on the primary side of the transformer T is $I_{FT} = 730$ mA.

As described above, every time the terminal voltage $V_{CS}$ of the condenser CS is 1.5V when the voltage $V_{CR}$ of the in-camera battery 22 is smaller than 3.2V, the charge control circuit 34 transfers the charge stored in the condenser CS, to the in-camera battery 22, and electrically charges the in-camera battery 22. When the voltage $V_{CR}$ of the in-camera battery 22 is 3.2V, the charge control circuit 34 disables the booster circuit 36 to stop charging the in-camera battery 22. At the same time, the charge control circuit 34 turns off the transistor Q1 (see FIG. 2) to stop charging the condenser CS by the solar battery 14.

Next, an explanation will be given of the case when the in-camera battery 22 is electrically charged at a high speed.

Because the electric current generated by the solar battery 14 provided in the lid is slight, the in-camera battery 22 cannot be electrically charged at a high speed. Therefore, when the high-speed electric charging is desired the external battery adapter 16, in which the external battery is housed, is set in the main body of the case 10 (see FIG. 1).

Thus, an output terminal 16A of the external battery 17, which is housed in the external battery adapter 16, is connected to the external power source input terminal 32 of the charging circuit 30 in FIG. 2. That is, the external battery 17 is connected to the condenser CS in parallel. Therefore, if a voltage $V_E$ of the external battery 17 is 0.9 or more and 1.5 or less, the electricity in the outer battery 17 is transferred to the in-camera battery 22 via the booster circuit 36.

If the outer battery 17 is used, the electricity required for one exposure is charged in the in-camera battery 22 in about one minute. If a new outer battery (a size AA battery) 17 is used, the in-camera battery 22, if depleted, 60%, can be charged completely to provide at least 100 exposures. Further, the AA size battery 17, which has already been used, can be reused, as some charge remains after the first charging.

In the above-described embodiment, every time the terminal voltage $V_{CS}$ of the condenser CS is 1.5V when the charging is performed by the solar battery 14, the transfer of the charge stored in the condenser CS is started. When the terminal voltage $V_{CS}$ of the condenser CS is 0.9, the transfer of the electricity is stopped. These processes are adapted to an electromotive force of the external battery 17.

However, the electromotive force of the solar battery 14 is larger than the external battery 17 (for example, more than 3.6V), the voltage $V_{CS}$ wherein the transfer of the electricity charged in the condenser CS is started, may be higher than 1.5V, when the charging is performed by the solar battery 14. In this case, if the booster circuit is constructed in accordance with the voltage of the external battery, there is a problem that the booster ratio becomes too high and the charging efficiency deteriorates when the charging is performed by the solar battery.

Figure 4:
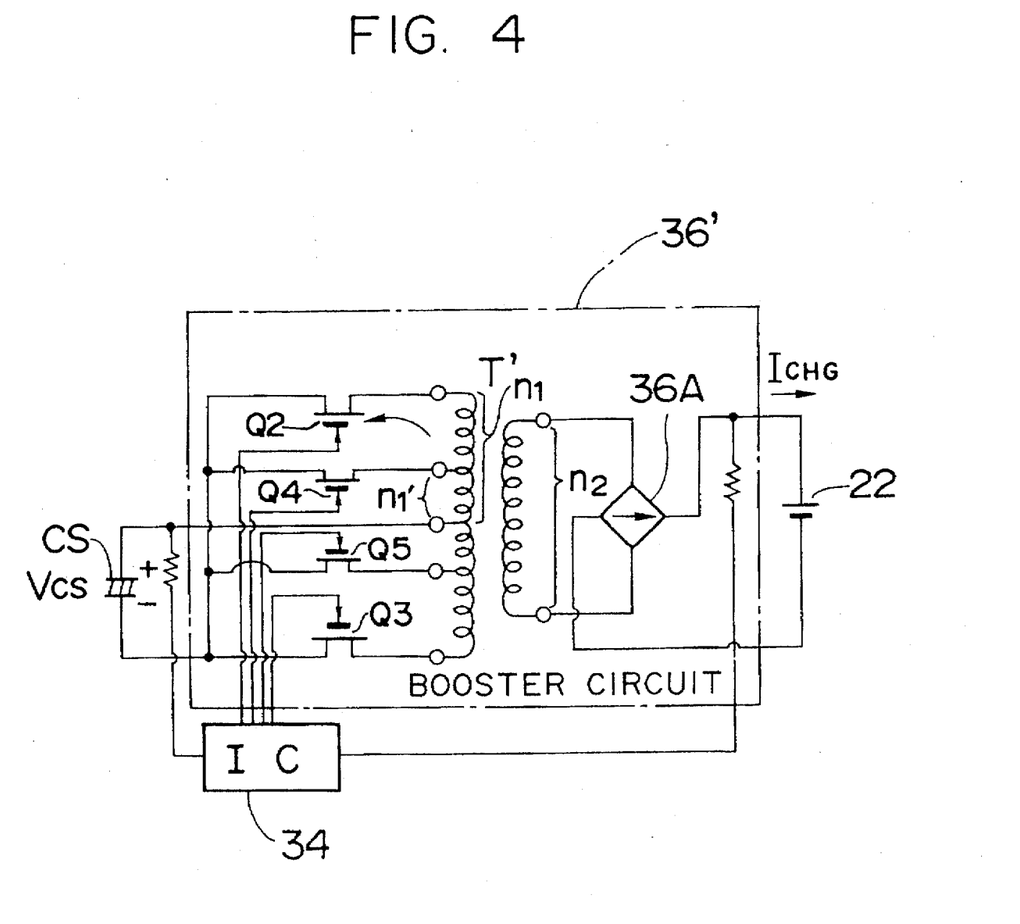
FIG. 4 is a circuit diagram illustrating the other embodiment of the booster circuit in FIG. 2.

FIG. 4 is a circuit diagram illustrating the other embodiment of the booster circuit 36 in FIG. 2. Because the same numbers are designated on the same parts as in the circuit of FIG. 3, a detailed explanation on them is not given here.

As shown in FIG. 4, the booster circuit 36' is a push-pull type, which can change its booster ratio. It converts the DC power source charged in the condenser CS into AC by the transistors Q2 and Q3 or the transistors Q4 and Q5, which are alternatively turned on through the charge control circuit 34. Then, the booster circuit 36' boosts the power source via a transformer T', and rectifies it in a rectifying circuit 36A so as to convert it into a DC voltage, which is required for charging the in-camera battery 22.

In this case, the electromotive force of the solar battery is, for example, 3.6V. Every time the terminal voltage $V_{CS}$ is 3.0V and when the external battery adapter 16 is not attached (that is, the charging is performed by the solar battery), the charge control circuit 34 starts transferring the charge stored in the condenser CS. When the terminal voltage $V_{CS}$ of the condenser CS is 2.0V, the transfer of the electricity is stopped. On the other hand, when the external battery adapter 16 is set (that is, the charging is performed by the external battery 17), the charge control circuit 34 controls the booster circuit 36' as described above.

Furthermore, when the charging is performed by the solar battery 14, the charge control circuit 34 controls the transistors Q2 and Q3 so that they can be turned on and off alternatively. Thus, in the transformer T', the voltage of the electricity transferred from the condenser CS can be boosted in the booster ratio corresponding to the electromotive force of the solar battery 14 and the external battery 17.

Next, an explanation will be given of the booster ratio, which is required in the booster circuit 36'.

Here, the number of turns on the primary side and the secondary side of a transformer T', in which the electric current runs when the charging is performed by the solar battery 14 (the transistors Q2 and Q3 are turned on), is $n_1$ and $n_2$, respectively, and a voltage on the primary side of the transformer T' is a voltage $V_1$. The required voltage $V_1$ on the primary side of the transformer T' is calculated by the following equation:

$$V_1 = 2.0 - V_{DS} = 1.8 \ [V] \ (\text{Min}) \qquad (4)$$

($V_{DS}$: a saturation voltage between drain and source of the transistors Q2 and Q3)

On the other hand, a required voltage $V_2$ on the secondary side of the transformer T' is 5.1V (see equation (3)), so the ratio $n_2/n_1$ of the number of turns of the transformer T' is as follows:

$$n_2/n_1 = V_2/V_1 \approx 2.8$$

Here, the number of turns on the primary side of the transformer T', in which the electric current runs when the charging is performed by the external battery 17 (a transistors Q4 or Q5 are turned on), is $n_1'$, and the voltage on the primary side of the transformer T' is $V_1$. The voltage $V_1'$, which is required when the charging is performed by the external battery 17, is 0.7V (Min) (see equation (2)), so the ratio of the number of turns of the transformer T' is as follows:

$$n_2/n_1' = V_2/V_1' \approx 7.3$$

As described above, the charge control circuit 34 changes the booster ratio of the booster circuit 36' based on whether the charging is performed by the solar battery 14 or the external battery 17 (that is, according to the electromotive force of each battery). Then, if the charging is performed by the solar battery 14, and every time the terminal voltage $V_{CS}$ of the condenser CS is 3.0V and when the in-camera battery voltage is smaller than 3.2V, the charge stored in the condenser CS is transferred to the in-camera battery 22, so that the in-camera battery can be electrically charged. When the voltage $V_{CR}$ of the in-camera battery 22 is 3.1V, the booster circuit 36 is disabled, stopping the charging of the in-camera battery 22. At the same time, the transistor Q1 (see FIG. 2) is turned off, and the charging in the in-camera battery by the solar battery 14 is stopped, so as to prevent the terminal voltage $V_{CS}$ of the condenser CS from exceeding 3.0V.

Moreover, when the external battery adapter 16 is set in the main body of the case 10, the switch 37 is turned on. Thus, the charge control circuit 34 detects that the external battery adapter 16 has been set in the case main body 10, and changes what is displayed on the display 38, and the like. Incidentally, the power supply for the display 38 is the above-mentioned double layer condenser GC.

Figure 5:
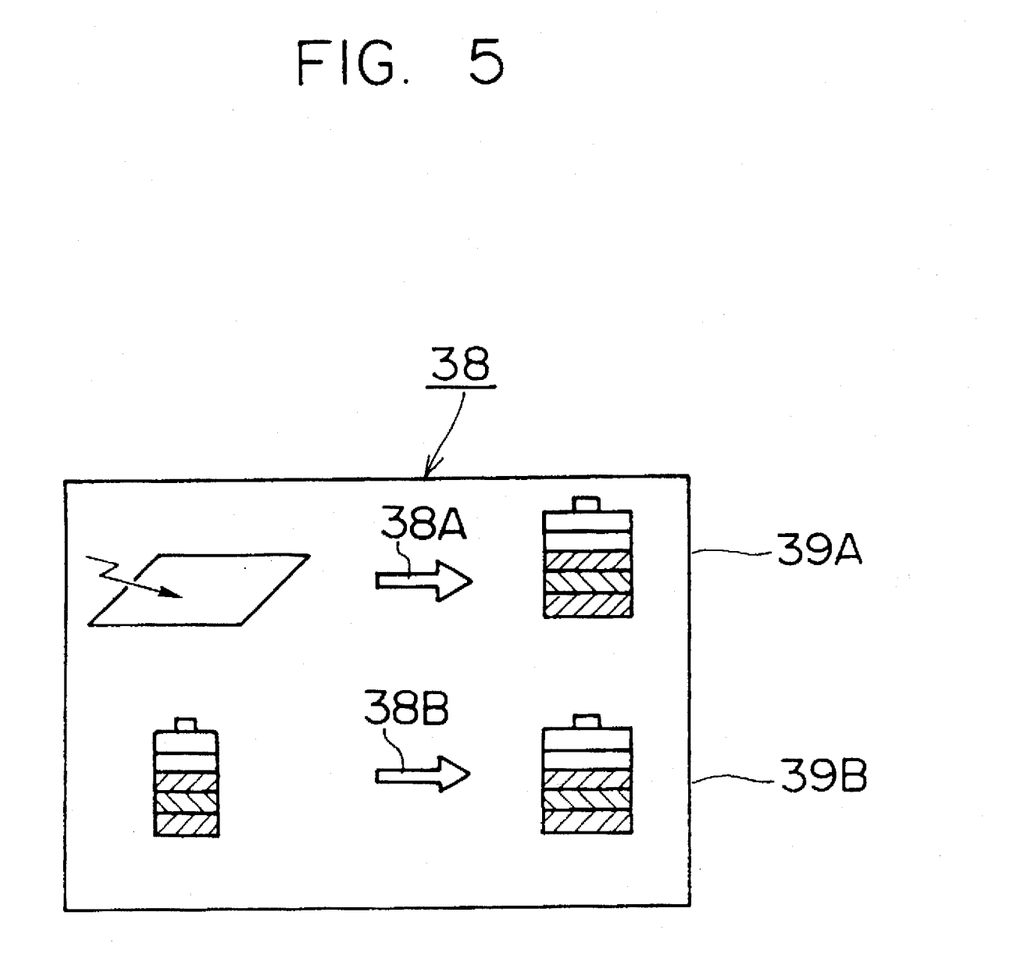
FIG. 5 is a plane view showing what is displayed on a display in FIG. 2.

As shown in FIG. 5, the display 38 has an upper display part 39A, which displays the quantity of electricity charged in the in-camera battery 22 by the solar battery 14, and a lower display part 39B, which displays the quantity of electricity charged in the in-camera battery 22 by the external battery 17. When the external battery is set in the main body of the case 10 and the in-camera battery 22 is electrically charged by the external battery 17, an arrow 38B at the lower display part 39B is lighted based on the ON information from the switch 37.

The charge control circuit 34 detects the voltage $V_{CR}$ of the in-camera battery 22 and the terminal voltage $V_{CS}$ of the condenser CS to control the charging as mentioned above. The charge control circuit 34 graphically displays on the display part 39A the quantity of electricity charged in the in-camera battery 22 in accordance with the detected voltage $V_{CR}$. When the in-camera battery 22 is electrically charged by the external battery 17, the residue in the external battery 17 is graphically displayed on the display part 39B based on the terminal voltage $V_{CS}$ of the condenser CS. The quantity of electricity charged in the in-camera battery 22 is graphically displayed on the display part 39B based on the voltage $V_{CR}$ of the in-camera battery 22. In the display part 39B, the left side of the drawing indicates the residue in the external battery 17, and the right side of the drawing indicates the quantity of electricity charged in the in-camera battery 22.

It can be easily understood whether the charging is being performed by the solar battery or the external battery from display 38. The quantity of electricity charged in the in-camera battery is also displayed. Furthermore, while the charging is being performed by the external battery, the residue in the external battery is displayed, too.

Incidentally, in this embodiment, when the in-camera battery 22 is electrically charged at high speed, the external battery adapter 16 is set in the main body of the case 10. The present invention, however, is not limited to this. An external battery storage part may be integrated with the main body of case. When the high-speed charging is performed, the external battery 17 may be set in the external battery storage part.

While the display 38 is shown in the camera case, the display part 38 may be provided at the camera 20. In this case, the display 38 is provided at a position where it can be seen when the camera 20 is stored in the camera case and the lid 12 is opened. That is, if the camera 20 is housed in the camera case face down, the display 38 is provided on the back surface of the camera. If the camera 20 is housed in the camera case face up, the display 38 is provided on the front surface of the camera.

Figure 6:
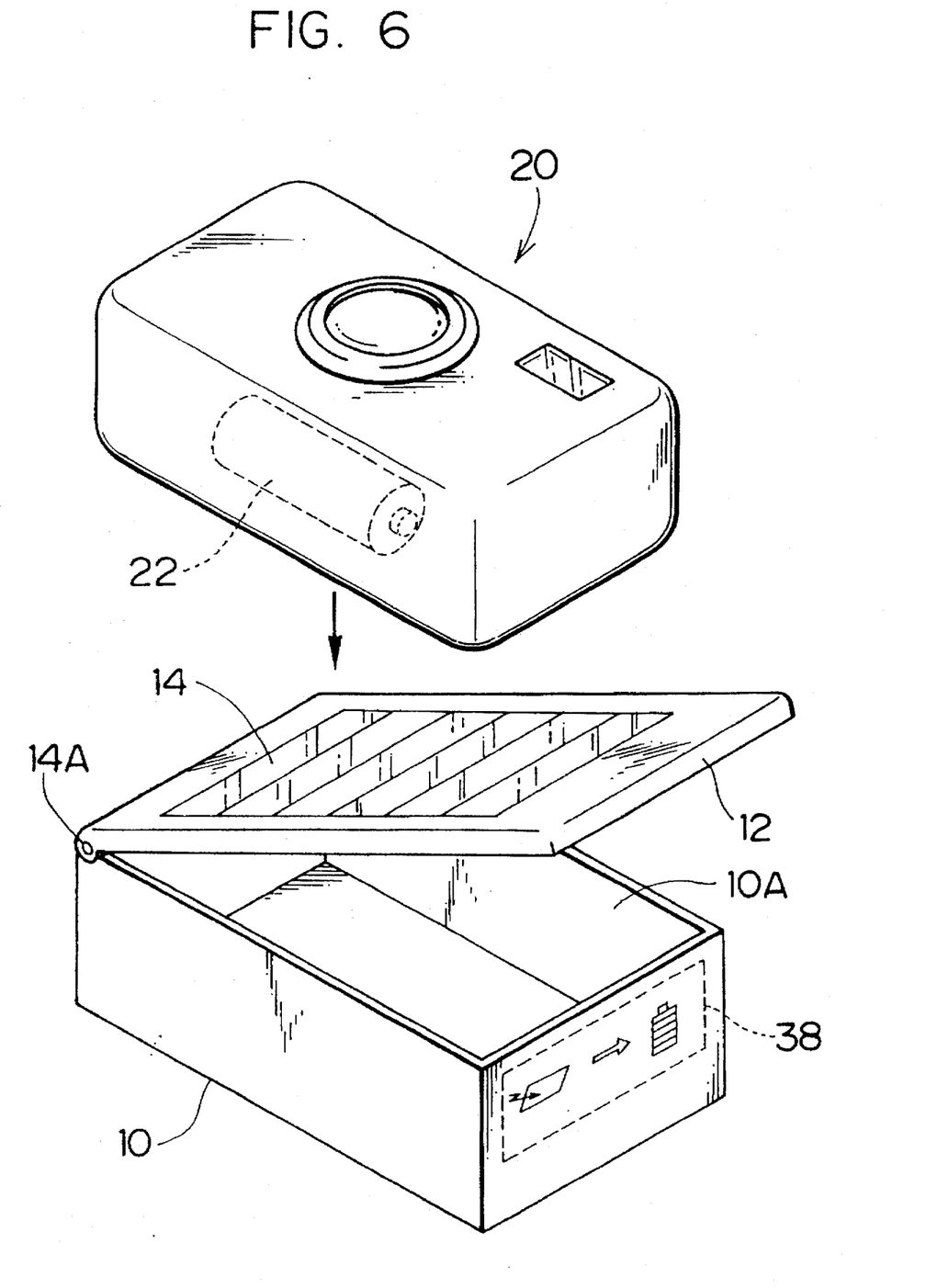
FIG. 6 is a perspective view illustrating the other embodiment of the camera battery charger according to the present invention.
Figure 7:
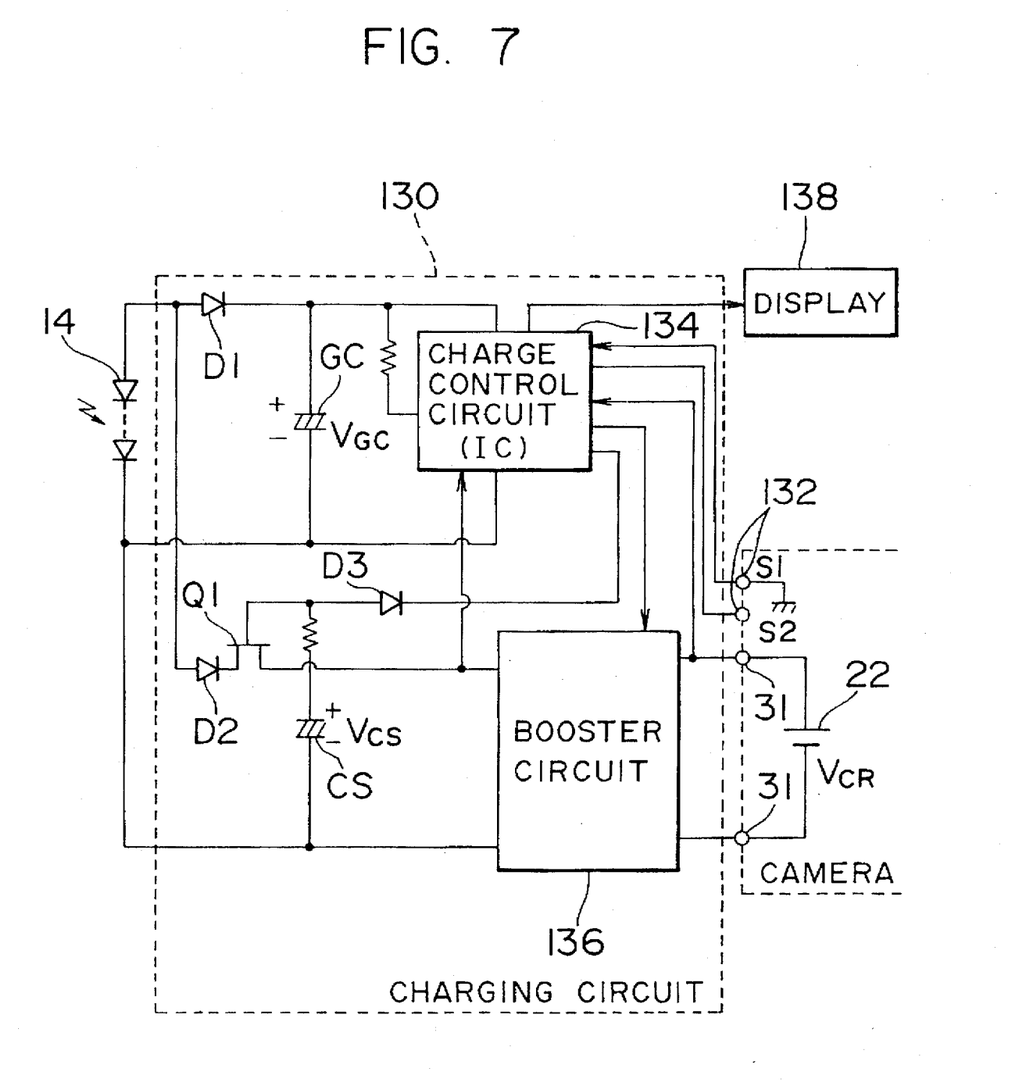
FIG. 7 is a circuit diagram illustrating the embodiment of the charging circuit provided in the camera battery charger in FIG. 6.

FIG. 6 is a perspective view illustrating the other embodiment of the camera battery charger according to the present invention. FIG. 7 is a circuit diagram illustrating a charging circuit provided within the camera battery charger in FIG. 6. Incidentally, the same numbers are designated on the same parts as those of the camera battery charger in FIGS. 1 and 2, and a detailed explanation about them is not given here.

The camera battery charger in FIGS. 6 and 7 is different from the one in FIGS. 1 and 2 mainly in that it is not provided with the external battery adapter, and has different charging circuit 130 and display 138.

Figure 8:
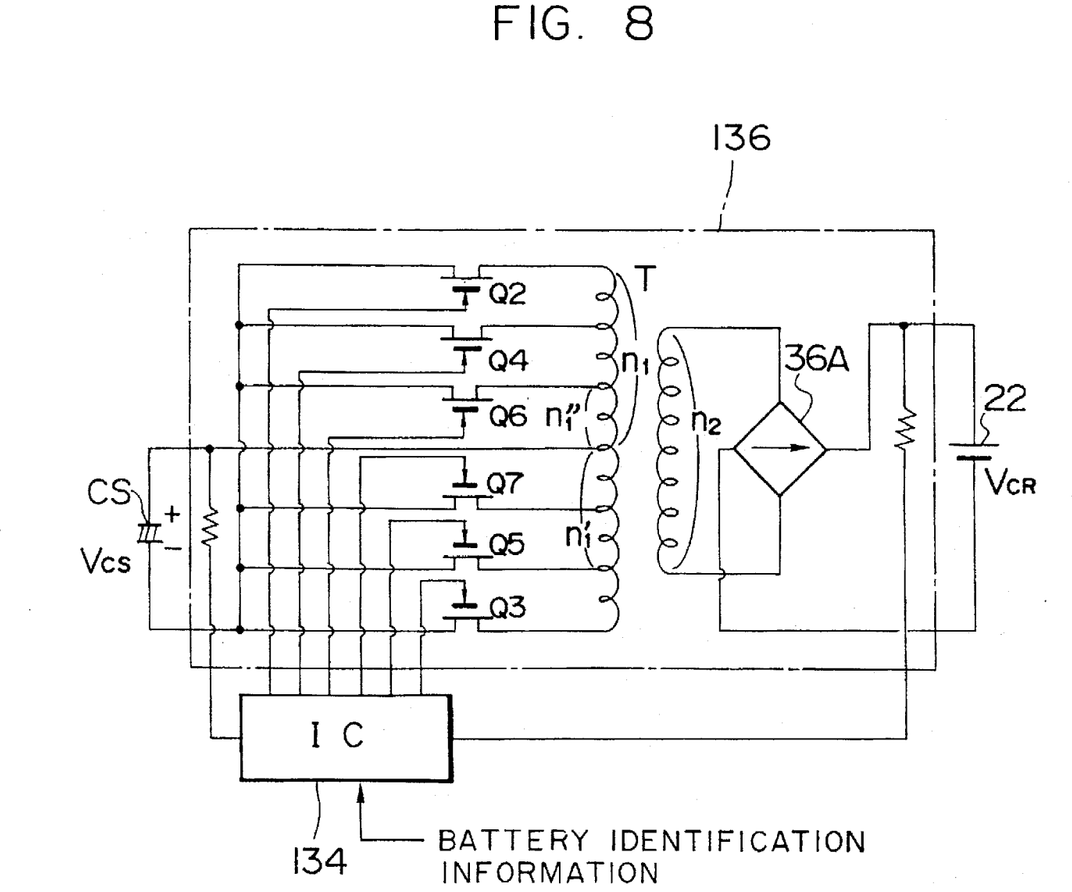
FIG. 8 is a detailed circuit diagram illustrating the booster circuit in FIG. 7.

As shown in FIGS. 7 and 8, the charging circuit 130 is different from the charging circuit 30 in FIGS. 2 and 3 in that it has a different charge control circuit 134 and booster circuit 136, and the charge control circuit 134 is connected to a battery identification terminal 132 (FIG. 7).

The battery identification terminal 132 comprises, for example, two terminals, and inputs battery identification information (S1, S2) composed of levels (H level, L level) detected at each terminal. The battery identification information (S1, S2) is peculiar to the in-camera battery, and, for example, corresponds to the voltage of the in-camera battery as shown in the following table.

TABLE 1

| Battery Identification Information | | Type of | Maximum |
|---|---|---|---|
| S1 | S2 | Battery | Voltage |
| H | H | — | — |
| H | L | A | 1.5 V |
| L | H | B | 3.2 V |
| L | L | C | 6.0 V |

As shown in the TABLE 1, the charge control circuit 134 recognizes the type of in-camera battery (that is, the voltage of the in-camera battery), which is to be electrically charged in accordance with battery identification information (S1, S2) from the battery identification terminal 132. Consequently, battery identification information corresponding to the voltage of the in-camera battery is transmitted to the camera battery charger. As shown in FIG. 7, for example, the battery identification terminal S1 provided at the camera 20 is grounded so that only S1 is at level L. The in-camera battery 22 is of type B, and its voltage is 3.2V as shown in the TABLE 1.

As shown in FIG. 7, when the power supply input terminal and the battery identification terminal are connected to the power supply output terminal 31 and the battery identification terminal 132, respectively, in the charging circuit 131, the charging of the in-camera battery begins.

The charge control circuit 134 controls the booster circuit 136, the display 138, the transistor Q1, and the like. It detects the terminal voltage $V_{CS}$ of the condenser CS and the voltage $V_{CR}$ of the in-camera battery 22, and identifies the maximum voltage of the in-camera battery, which is to be charged, on the basis of the battery identification information transmitted via the battery identification terminal 132.

Then, the charge control circuit 134 controls the booster circuit 136 in accordance with the type (A, B or C) of the in-camera battery and the terminal voltage $V_{CS}$ of the condenser CS on the following condition:

Battery A: $V_{CR}<1.5V$

Battery B: $V_{CR}<3.2V$

Battery C: $V_{CR}<6.0V$

Thus, the in-camera battery is charged from the electricity stored in the condenser CS. That is, when the condenser CS is charged and its terminal voltage $V_{CS}$ is 3.0V, the charge control circuit 134 drives the booster circuit. When the condenser CS and terminal voltage $V_{CS}$ is 2.0V, the charge control circuit 134 stops the booster circuit 136. Further, when driving the booster circuit 136, the charge control circuit 134 changes the booster ratio in the booster circuit 136 in accordance with the type (A, B and C) of the in-camera battery as described later.

Incidentally, the charge control circuit 134 disables the booster circuit 136 in accordance with the type (A, B or C) of the in-camera battery, when the voltage $V_{CR}$ is as follows:

Battery A: $V_{CR}\geq1.5V$

Battery B: $V_{CR}\geq3.2V$

Battery C: $V_{CR}\geq6.0V$

Moreover, when the charging is performed by the solar battery 14, the charge control circuit 134 turns off the transistor Q1 if the terminal voltage $V_{CS}$ of the condenser CS is 3.0V, so as to prevent the terminal voltage $V_{CS}$ of the condenser CS from exceeding 3.0V.

Next, an explanation will be given of the booster circuit 136.

FIG. 8 is a circuit diagram illustrating one embodiment of the booster circuit 136. As shown in the drawing, the booster circuit 136 is a push-pull type, and converts the DC power supply charged in the condenser CS into AC by the transistors Q2 and Q3, the transistors Q4 and Q5, or the transistors Q6 and Q7, which are alternatively turned on by the charge control circuit 134. Then, the booster circuit 136 boosts the converted AC power supply by the transformer T, and rectifies it in a rectifying circuit 36A, so as to covert it into a DC voltage, which is required for charging the in-camera battery 22.

The charge control circuit 134 changes the booster ratio in the booster circuit 136 in accordance with the type (A, B or C) of the in-camera battery. That is, when the battery of type A (maximum voltage 1.5V) is electrically charged, the transistors Q2 and Q3 are turned on/off alternately. When the battery of type B (maximum voltage 3.2V) is electrically charged, the transistors Q4 and Q5 are turned on/off alternately. Thus, the number of turns in the transformer T is changed so that the charging voltage corresponding to the maximum voltage of the in-camera battery can be obtained.

Here, the number of turns on the primary and secondary sides of the transformer T, in which the electric current runs when the battery A is charged (when the transistor Q2 or Q3 is turned on), is $n_1$ and $n_2$, respectively, and the voltage on the primary and secondary sides of the transformer T is $V_1$ and $V_2$. When the battery A is charged, the required voltage $V_1$ and $V_2$ on the primary and secondary sides of the transformer T is calculated by the following equations:

$$V_1 = 2.0 - V_{DS} = 1.8 \ [V] \ (Min)$$

$$V_2 = 1.5 + 0.7 \times 2 + 0.5 = 3.4 \ [V]$$

($V_{DS}$: saturation voltage between drain and source of the transistors Q2 and Q3

1.5: maximum voltage of the battery A 0.7×2: the decrease of the voltage in the rectifying circuit 36A)

Thus, the ratio $n_2/n_1$ of the number of turns of the transformer T is as follows:

$$n_2/n_1 = V_2/V_1 \approx 1.9$$

If the required voltage on the secondary side of the transformer T is $V_2'$ when the charging is performed by the battery B, the voltage $V_2'$ is as follows:

$$V_2' = 3.2 + 0.7 \times 2 + 0.5 = 5.1 \ [V]$$

(3.2: the maximum voltage of the battery B)

If the number of turns on the primary side of the transformer T, in which the electric current runs, is $n_1'$ when the charging is performed by the battery B (when the transistor Q4 or Q5 is turned on), the ratio $n_2/n_1'$ of the number of turns is as follows:

$$n_2/n_1' = V_2'/V_1 \approx 2.8$$

Likewise, if the required voltage on the secondary side of the transformer T is when the charging is performed by the battery C, the voltage $V_2''$ is as follows:

$$V_2'' = 6.0 + 0.7 \times 2 + 0.5 = 7.9 \ [V]$$

(6.0: the maximum voltage of the battery C)

If the number of turns on the primary side of the transformer T is $n_1''$ when the charging is performed by the battery C (the transistor Q6 or Q7 is turned on), the ratio $n_2/n_1''$ of the number of turns of the transformer T is as follows:

$$n_2/n_1'' = V_2''/V_1 \approx 4.4$$

The charge control circuit 134 changes a tap position of a coil on the primary side of the booster circuit 136 in accordance with the maximum voltage of the in-camera battery, which is to be charged. It also changes the booster ratio.

Therefore, as shown in FIG. 8, when the in-camera battery 22, of which maximum voltage is 3.2V, is charged, the charge control circuit 134 turns on the transistors Q4 and Q5 of the booster circuit 136 alternatively to boost the voltage $V_{CS}$ by the transformer T every time the terminal voltage $V_{CS}$ of the condenser CS is 3.0V when the voltage $V_{CR}$ of the in-camera battery 22 is lower than 3.2V. Then, the electric charge in the condenser CS is transferred to the in-camera battery 22, charging the in-camera battery 22. When the voltage $V_{CR}$ of the in-camera battery 22 is 3.2V, the charge control circuit 136 disables the booster circuit 136 to stop charging the in-camera battery 22. At the same time, the charge control circuit 136 turns off the transistor Q1 (see FIG. 7) to stop charging the condenser CS by the solar battery, so as to prevent the terminal voltage $V_{CS}$ of the condenser CS from exceeding 3.0V.

Figure 9:
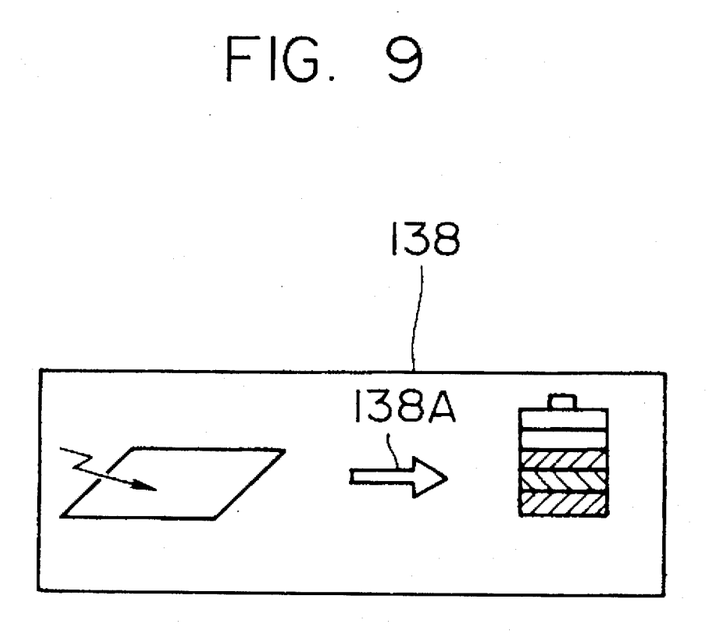
FIG. 9 is a plane view illustrating a display used for explaining the display in FIG. 7.

Moreover, the charge control circuit 134 also controls what is displayed on the display 138 depending on the maximum voltage of the in-camera battery which is to be charged.

That is, as shown in FIG. 9, the display 138 has a display part, which indicates that the in-camera battery is charged by the solar battery. If the in-camera battery 22 is being charged by the solar battery, the charge control circuit 134 lights an arrow 138A at the display part. Furthermore, the charge control circuit detects the voltage of the in-camera battery 22 as mentioned above, and graphically displays a quantity of electric charge in the in-camera battery depending on the detected voltage $V_{CR}$. In this case, the display indicating the quantity of electric charge in the in-camera battery is changed according to the maximum voltage of the in-camera battery. For example, a $V_{CR}$ of 1.5V will result in a display of a fully charged battery if the battery is of the type A, whereas the same $V_{CR}$ will result in a display of a ¼ charged battery if the battery if of type C.

Incidentally, in the camera battery charger constructed in the above-mentioned manner, the battery identification information indicating the maximum voltage of the in-camera battery is inputted via the battery identification terminal connected to the camera. The present invention, however, is not limited to this. The battery identification information may be inputted manually. In this case, it is possible to charge in the in-camera battery of a camera with no battery identification terminal.

As has been described above, according to the camera battery charger of the present invention, the in-camera battery can be electrically charged by the solar battery, and the in-camera battery can be electrically charged at a high speed by the external battery in the external battery adapter attached at the main body of the case, or the external battery stored in the external battery storage part integrated with the main body of the case. Thus, the solar battery makes it possible to cope with an emergency when there is no time for fully charging the in-camera battery.

Moreover, according to the present invention, it can be easily known from what is displayed on the display means whether the in-camera battery is electrically charged by the solar battery or the external battery. The quantity of charge in the in-camera battery can also be known, and the residue in the external battery can be known when the external battery is electrically charged. Furthermore, according to the present invention, the booster ratio of the booster means for charging the in-camera battery is changed to correspond to the electromotive forces of the solar battery and the external battery. Therefore, there is an advantage in that the in-camera battery can be charged efficiently. Because the electricity generated by the solar battery is used as the power supply for driving the battery charger, there is no need for a flashlight battery, a button battery, etc.

Furthermore, according to the present invention, when the voltage generated by the solar battery is boosted by the booster means, and the in-camera battery is electrically charged, the booster ratio of the booster means is changed so that the charging battery can correspond to the voltage of the in-camera battery which is to be charged. Therefore, the in-camera battery in plural types of cameras, which have different voltages, can be electrically charged. Moreover, the charging is performed efficiently regardless of the voltage of the in-camera battery which is to be charged.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A camera battery charger comprising:
    a camera case storing therein a camera with a chargeable in-camera battery;
    a solar battery arranged in the camera case;
    an external battery adapter storing therein an external battery and being freely attached and detached from the camera case;
    charging means including a power supply output terminal connected to a camera stored in the camera case for charging the in-camera battery by the solar battery, and charging the in-camera battery by the external battery in the external battery adapter when the external battery adapter is attached at the camera case.

2. The camera battery charger according to claim 1, wherein the external battery adapter is attached at the camera case when high speed charging is performed.

3. A camera battery charger comprising:
    a camera case having a camera storage part for storing therein a chargeable in-camera battery and an external battery storage part for storing therein an external battery;
    a solar battery provided in the camera case; and
    charging means including a power supply output terminal connected to a camera stored in the camera case for charging the in-camera battery by the solar battery, and charging the in-camera battery by an external battery when the external battery is stored in the external battery storage part.

4. The camera battery charger according to claim 3, wherein the external battery is stored in an external battery storage part of the camera case when high speed charging is performed.

5. The camera battery charger according to claim 1, comprising a main body of the case for storing therein, and a lid arranged in such a manner to open and close freely with regard to the main body of the case, and wherein the solar battery is provided in the lid.

6. The camera battery charger according to claim 1, wherein the charging means comprises a condenser charged by the solar battery, a booster circuit which boosts an output voltage of the condenser and outputs it to the power supply output terminal, and a charge control circuit which makes the booster circuit operable only if a voltage of the in-camera battery is suitable for charging and a terminal voltage of the condenser is within a predetermined range.

7. The camera battery charger according to claim 1, comprising:
    display means having a first display part for indicating that the in-camera battery is being charged by the solar battery, and a second display means for indicating that the in-camera battery is being charged by the second display means; and
    display part changing means for making the first display part of the display means display while the in-camera battery is being charged by the solar battery, and for making the second display part of the display means display while the in-camera battery is being charged by the external battery.

8. The camera battery charger according to claim 7 wherein the display means has a third display part for displaying a quantity of electric charge in the in-camera battery, the third display part being controlled in accordance with a voltage of the in-camera battery.

9. A camera battery charger with a chargeable in-camera battery, comprising:
    a solar battery;
    an external battery with an electromotive force different from an electromotive force generated by the solar battery;
    first booster means for boosting a voltage generated by the solar battery;
    a second booster means for boosting a voltage which is output from the external battery so that the voltage is substantially equal to a voltage boosted by the first booster means; and
    charge control means for controlling the first booster means when the external battery is not set so that the in-camera battery is charged by solar battery, and for controlling the second booster means when the external battery is set so that the in-camera battery is charged by the external battery.

10. The camera battery charger according to claim 9, further comprising a condenser charged by the solar battery, and wherein electric charge in the condenser is transferred to the in-camera battery by the first booster means until the terminal voltage of the condenser reaches a predetermined minimum value, when the terminal voltage reaches a predetermined maximum value while the external battery is not set.

11. The camera battery charger according to claim 9, wherein the charge control means transfers the electricity in the external battery to the in-camera battery via the second booster means while a voltage of the external battery is in a predetermined range when the external battery is set.

12. The camera battery charger according to claim 9, further comprising a camera case storing the camera therein, and wherein the camera case is provided with the solar battery, the first and second booster means and the charge control means.

13. The camera battery charger according to claim 12, wherein the external battery is stored in an external battery storage part of the camera case when high speed charging is performed, or the external battery is set in the camera case via an external battery adapter.

14. A camera battery charger with a chargeable in-camera battery, comprising:

a solar battery;

a power supply charged by the solar battery; and charging means which is driven by the power supply so that the in-camera battery is charged depending on the electricity obtained from the solar battery;

wherein said chargeable in-camera battery is not connected to said charging means to supply power to said charging means.

15. The camera battery charger according to claim 14 wherein the power supply is an electric double layer condenser.

16. The camera battery charger according to claim 14, comprising a condenser charged by the solar battery; a booster circuit, said booster circuit increasing an output voltage of the condenser, said increased output voltage being supplied to the in-camera battery; and a charge control circuit, said charge control circuit enabling the booster circuit only if a voltage of the in-camera battery is below a predetermined threshold and a terminal voltage of the condenser is within a predetermined range.

17. The camera battery charger according to claim 14, further comprising display means for displaying a quantity of electric charge which is charged in the in-camera battery by the solar battery, and wherein the power supply is used as a power supply for driving the display means.

18. A camera battery charger in plural types of cameras having rechargeable batteries having different voltage, comprising:

a solar battery;

booster means of which booster means is changed so that the voltage generated by the solar battery is suitable for charging the in-camera battery in plural types of cameras;

means for detecting or setting information as to the voltage of the in-camera battery in a camera which is to be charged; and charge control means for changing the booster ratio of the booster means in accordance with the detected or set information as to the voltage of the in-camera battery, so that the in-camera battery is charged.

19. The camera battery charger according to claim 18, further comprising a condenser charged by the solar battery, and wherein the charge control means transfers the electric charge in the condenser to the in-camera battery in a booster ratio corresponding to the voltage of the in-camera battery until the terminal voltage of the condenser reaches a predetermined maximum value, when the terminal voltage of the condenser reaches a predetermined maximum value.

20. The camera battery charger according to claim 18, further comprising a camera case for storing therein a plural type of cameras, and wherein the solar battery, the booster means and the charge control means are provided in the camera case.

* * * * *